United States Patent
Ueda et al.

[11] Patent Number: 5,103,412
[45] Date of Patent: Apr. 7, 1992

[54] WIDTH MEASURING DEVICE

[75] Inventors: Hidesi Ueda, Higashiosaka; Akira Kobayashi, Osaka, both of Japan

[73] Assignee: Matsushita Electric Industrial Co., Ltd., Osaka, Japan

[21] Appl. No.: 613,991

[22] Filed: Nov. 15, 1990

[30] Foreign Application Priority Data

Nov. 17, 1989 [JP] Japan .................. 1-300440

[51] Int. Cl.$^5$ .................. G06K 9/52
[52] U.S. Cl. .................. 364/563; 356/384
[58] Field of Search .................. 364/563, 554, 560, 561, 364/550, 574; 382/22; 356/384, 387; 250/560; 358/102, 107, 139

[56] References Cited

U.S. PATENT DOCUMENTS

| | | | |
|---|---|---|---|
| 4,570,180 | 2/1986 | Baier et al. | 358/106 |
| 4,636,639 | 1/1987 | Guillaume et al. | 356/384 |
| 4,866,782 | 9/1989 | Sugie et al. | 364/563 |
| 4,868,683 | 9/1989 | Schulz | 358/107 |
| 4,942,463 | 7/1990 | Hopkins | 358/107 |

Primary Examiner—Parshotam S. Lall
Assistant Examiner—Michael Zanelli
Attorney, Agent, or Firm—Wenderoth, Lind & Ponack

[57] ABSTRACT

A width measuring device for measuring a width between first and second parallel edges of a track of a disk includes a video scanner for cross scanning the track within a predetermined area, and a sampling point detector for detecting crossing points between the edges of the track and a plurality of scanning lines. The number of occurrence of the sampled points are counted to provide distribution curves for the both side edges. Each distribution curve is divided into groups such that one group extends from one zero occurrence point to a next zero occurrence point with at least one peak point occurring between the two zero occurrence points. One dominant group is selected from each side, and an average point of the dominant group is defined as hypothetical centers. A valid region which expands a predetermined range from the hypothetical center is set for each side, and an average value of the valid region is calculated for each side. A width is obtained by calculating a distance between the average values for both sides.

3 Claims, 7 Drawing Sheets

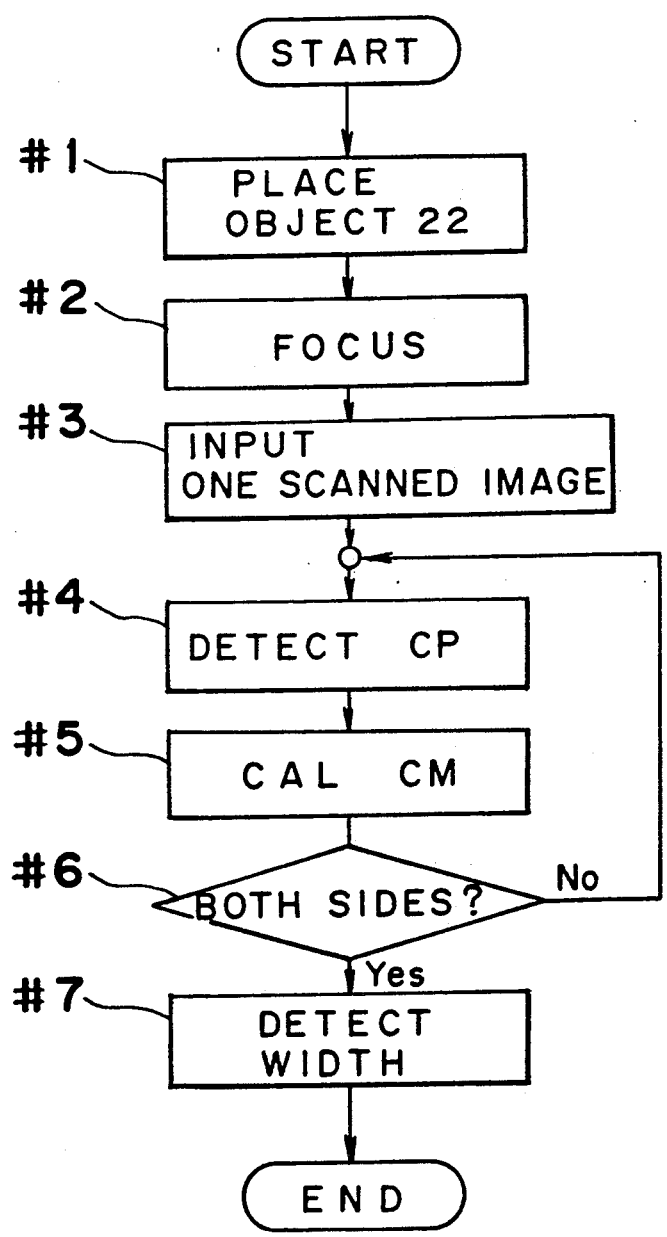

WIDTH MEASURING DEVICE

BACKGROUND OF THE INVENTION

1. Field of the Invention

The present invention relates to a width measuring device which measures a width parameter, such as a track width of a magnetic head on a disk, at high speed and with high precision by means of an image input device.

2. Description of the Prior Art

Conventional high precision, non-contact width measuring devices which have been practically employed include devices which measure a width by means of image data input by way of a television camera.

One such conventional image measuring device which uses image data is described hereinbelow with reference to the accompanying FIGS. 4 and 5, which are a block diagram of a conventional image measuring device and a flow chart of the operation thereof, respectively.

As shown in FIG. 4, an object 22 to be measured and having parallel characteristic members (CM) is placed on a measurement stand 21. A light 23 for illuminating the object 22 is provided. A television camera 24 is mounted on the end 25 of an actuator of a robot or other device. The television camera 24 is used to input a video image of the object 22 and is positioned perpendicular to the object 22. The TV camera 24 is controlled by a camera control circuit 26.

The video signal input by the TV camera 24 is input to an analog/digital convertor 27 (hereinafter A/D convertor), digitized to graphic data on a scale of 0–255 based on the image density (i.e., converted to a (normally) gray scale image), and this data is input to a microcomputer comprising a CPU, ROM, RAM, and I/O ports.

The image measuring device comprises a detection control circuit (CPU) 29 to which commands are applied from a main controller or from a control panel, a characteristic point (CP) detection circuit 28, a memory control circuit 30, a characteristic member (CM) calculation circuit 31, a parameter memory 32, and a width detection circuit 33. The measurement results are sent to the main controller. An image measuring device so comprised operates as described below.

As shown in the flow chart in FIG. 5, the first step #1 is to place the object 22 to be measured on the stand 21. The object, 22 is then mechanically positioned so that parallel left and right side characteristic members (CM) on the object 22 are perpendicular to the scanning lines of the TV camera 24 (step #1). The TV camera 24 is then focused (step #2), and one scanned image is input (step #3). The characteristic points (CP) at which the multiple scanning lines intersects perpendicularly with the left side characteristic member are detected (step 4) and are stored as X coordinate data. Then, the average of the X coordinates in the resulting characteristic point set is obtained (step 5), and the same operation is then executed for the right side characteristic member (step 6). The distance between the left and right sides resulting from the average calculations performed on the sets of characteristic points is then obtained to determine the width of the object 22 being measured (step 7).

However, with a device as described above, a line representing the edge of one characteristic member of the object being measured is obtained by calculating the average value of a set of characteristic points on an axis perpendicular to said member after calculating the points of the characteristic member of the object 22 intersecting each scanning line set perpendicular to the member. As a result, all characteristic points, including false points far removed from the true points and resulting from data instability factors including contrast and shadows caused by the lighting when the image is obtained by the camera and noise caused by dust and other sources, are used in calculating the characteristic members. This can result in measurements with low reliability.

In addition to the above problem, the processing required to obtain the characteristic points of the characteristic members is time-consuming.

SUMMARY OF THE INVENTION

The present invention has been developed with a view to substantially solving the above described disadvantages and has for its essential object to provide an improved width measuring device which defines an appropriate processing range to remove false characteristic points, and specifically removes unreliable data caused by noise, and to measure a track width from characteristic points not including points resulting from low reliability factors such as the effects of noise.

In order to achieve the aforementioned objective, a width measuring device for measuring a width between first and second parallel characteristic members according to the present invention comprises: an image input means for obtaining a video signal image of said pair of parallel characteristic members; a characteristic point detection means for detecting crossing points between the characteristic members and a plurality of scanning lines intersecting perpendicularly with the characteristic members; a characteristic point occurrence distribution generator for projecting characteristic points on an X-axis reference line parallel to the scanning lines, and for obtaining first and second distribution sets $N_L$ and $N_R$ for said first and second characteristic members, respectively, wherein sets $N_L$ and $N_R$ are sets of data expressing the occurrence distribution of the position of the characteristic points on said X-axis and are defined as $$N_L = \{N_{LXi} | i=1,2,3 \ldots m\}, \text{ and}$$

$$N_R = \{N_{RXj} | j=1,2,3 \ldots n\},$$

in which $N_{LXi}$ and $N_{RXj}$ are set elements; a grouping means for dividing said set elements $N_{LXi}$ into first groups, and said set elements $N_{RXj}$ into second groups, each group covering set elements from $N_{LXis}$ to $N_{LXie}$ and $N_{RXjs}$ to $N_{RXje}$, respectively, for $N_{LXi}$ and $N_{RXj}$ from $i=is1$ and $j=js1$ at which $N_{LXi}$ and $N_{RXj}$ change from zero to take a non-zero value, to $i=ie1$ and $j=je1$ at which $N_{LXi}$ and $N_{RXj}$ are changed to next zero; a group selection means for selecting a first dominant group from said first groups and a second dominant group from said second groups, based on measurement conditions; a hypothetical center calculation means for obtaining first and second average points along X-axis of the selected first and second groups, respectively, and for defining first and second average points as hypothetical centers $\hat{X}L$ and $\hat{X}R$ of the first and second dominant groups; a characteristic member calculation means for calculating first and second valid regions $X_L$ and $X_R$ defined as follows, $$X_L = \{X_{Li} | \hat{X}L - \sigma \geq X_i \geq \hat{X}L + \sigma\}$$

$$X_R = \{X_{Rj} | \hat{X}R - \sigma \geq X_j \geq \hat{X}R + \sigma\}.$$

obtaining means for obtaining, along X-axis, first and second average values a and b of the first and second valid regions $X_L$ and $X_R$; and a width detection member for calculating a width $h = b - a$ between said first and second characteristic members.

In a second preferred embodiment of the present invention, the group selection means selects, when selecting a first dominant group, the group with the lowest value i, and when selecting the second dominant group, the group with the highest value j.

An image measuring device according to the present invention as described above is able to remove characteristic points containing noise and/or other instability factors by means of the characteristic member calculation means and the occurrence distribution generator, which determines the occurrence of characteristic points on each of multiple lines, after characteristic points at the outside perimeter of the object being measured are obtained from the input image for each line set perpendicular to the characteristic members. This image measuring device is therefore able to calculate from only valid characteristic points the position of the characteristic members with high reliability, thereby enabling high precision width measurement.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which:

FIG. 5 is a flow chart showing the operation of the width measuring device of FIG. 4.

DETAILED DESCRIPTION OF THE PREFERRED EMBODIMENT

A preferred embodiment of a width measuring device according to the present invention is described hereinbelow with reference to FIGS. 1-3.

Figure 1:
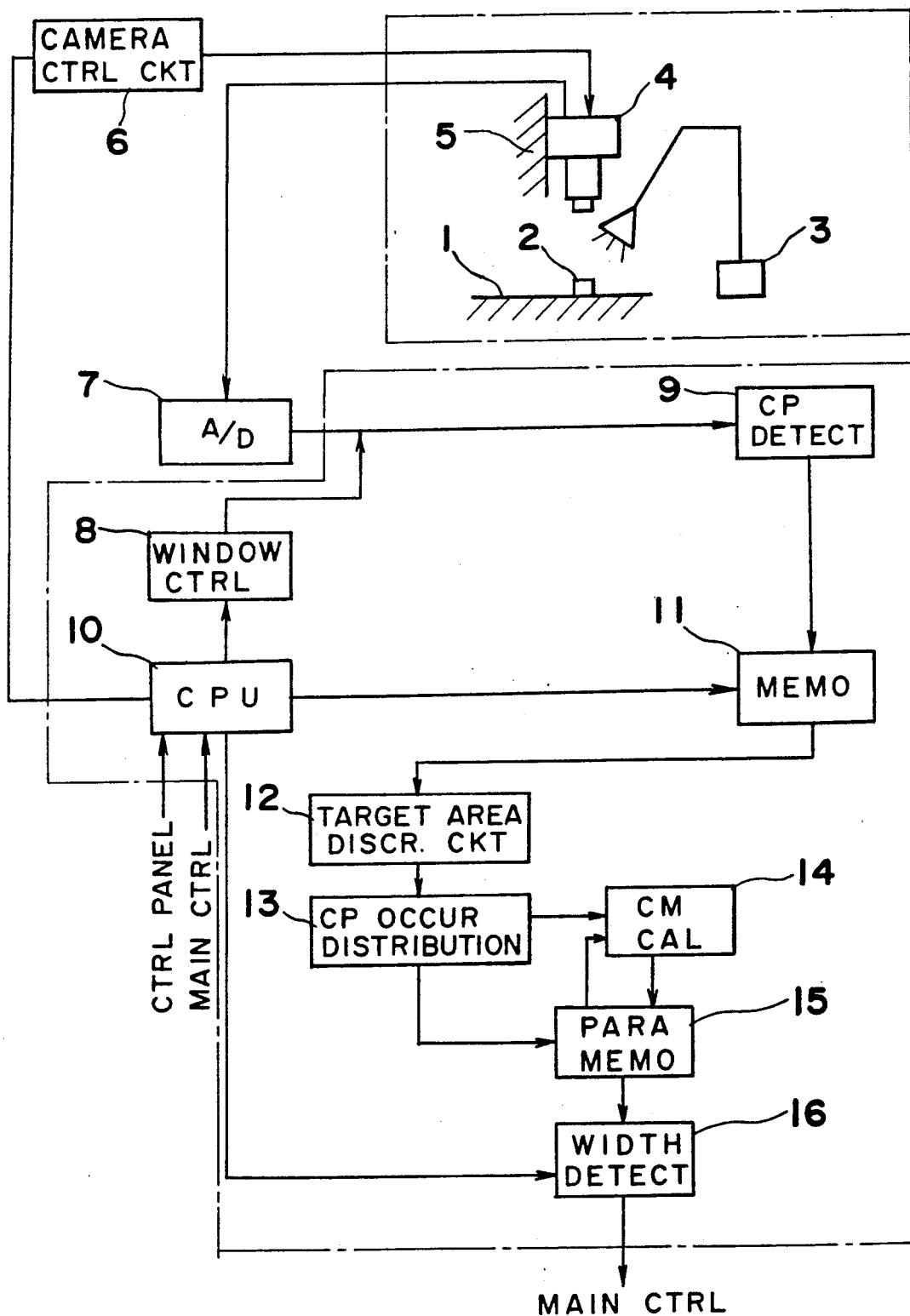
FIG. 1 is a block diagram of a width measuring device according to a preferred embodiment of the present invention.

Referring to FIG. 1, a block diagram of the width measuring device according to a preferred embodiment of the present invention is shown. An object 2 to be measured and having parallel characteristic members, such as tracks of a magnetic head, is placed on a measurement stand 1. A light 3 for illuminating the object 2 is provided, and a television camera 4 used to pick up a video image of the object 2 is mounted on the end 5 of an actuator of a robot or other device. Thus, the TV camera 4 is positioned perpendicularly to the object 2.

The TV camera 4 is controlled by a camera control circuit 6.

The video signal input by the TV camera 4 is applied to the A/D convertor 7 for forming digitized graphic data of 0-255 image density gray levels (i.e., converted to a gray scale image). The graphic data is applied to a microcomputer comprising a CPU (such as an Intel 80186 device), ROM, RAM, and I/O ports.

The width measuring device comprises a central processing unit (CPU) 10 to which commands are applied from a main controller or from a control panel, a window frame control circuit 8, a characteristic point (CP) detection circuit 9, a memory control circuit 11, a target area discrimination circuit 12, a characteristic point occurrence distribution generator 13, a characteristic member (CM) calculation circuit 14, a parameter memory 15, and a width detection circuit 16. The measurement results are sent to the main controller. A width measuring device so comprised operates as described below.

Figure 2A:
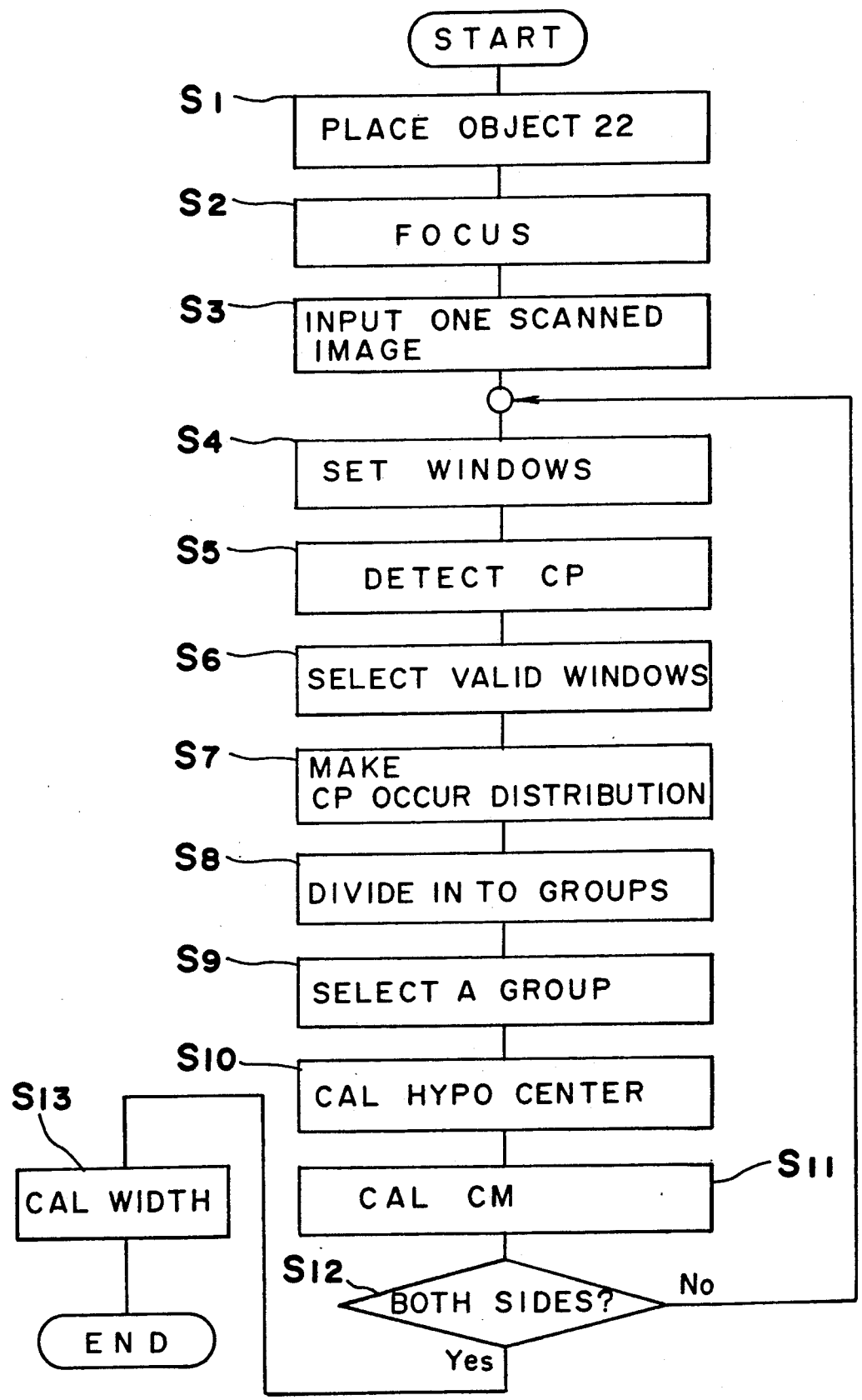
FIGS. 2a and 2b are flow charts showing the operation of the width measuring device of FIG. 1.
Figure 2B:
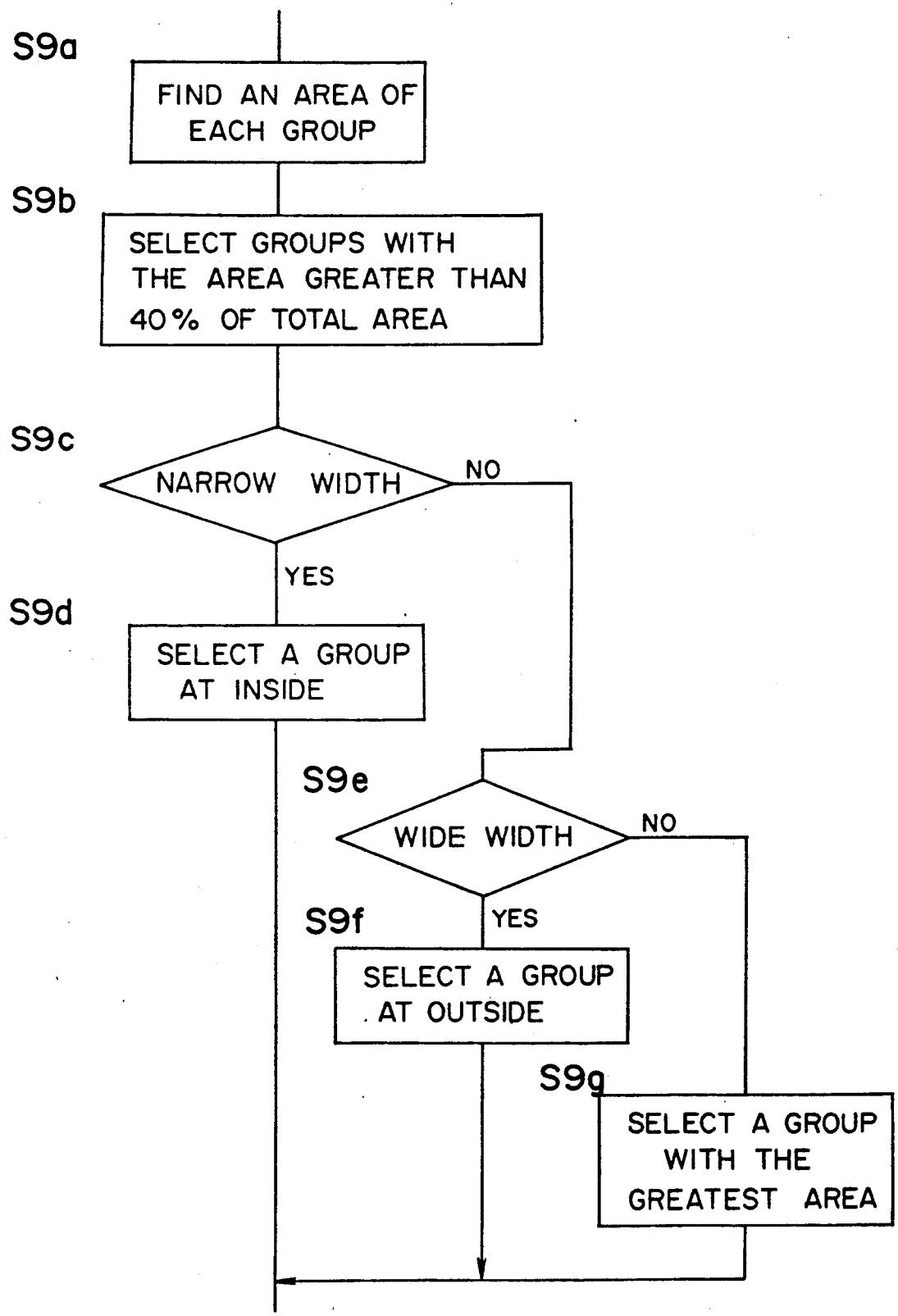

As shown in the flow chart in FIGS. 2a, and 2b, the first step is to place the object 2 such as a disk on the stand 1, and to mechanically position the object 2 (step S1). The TV camera 4 is then focused (step S2), and one scanned image is input (step S3). These initial steps are deemed the image pick up procedure. Next, the subsequent steps are carried out for the detection of the parallel characteristic members, for example the detection of the edges at opposite sides of the track. The detection is carried out one characteristic member (side) at a time.

Figure 3A:
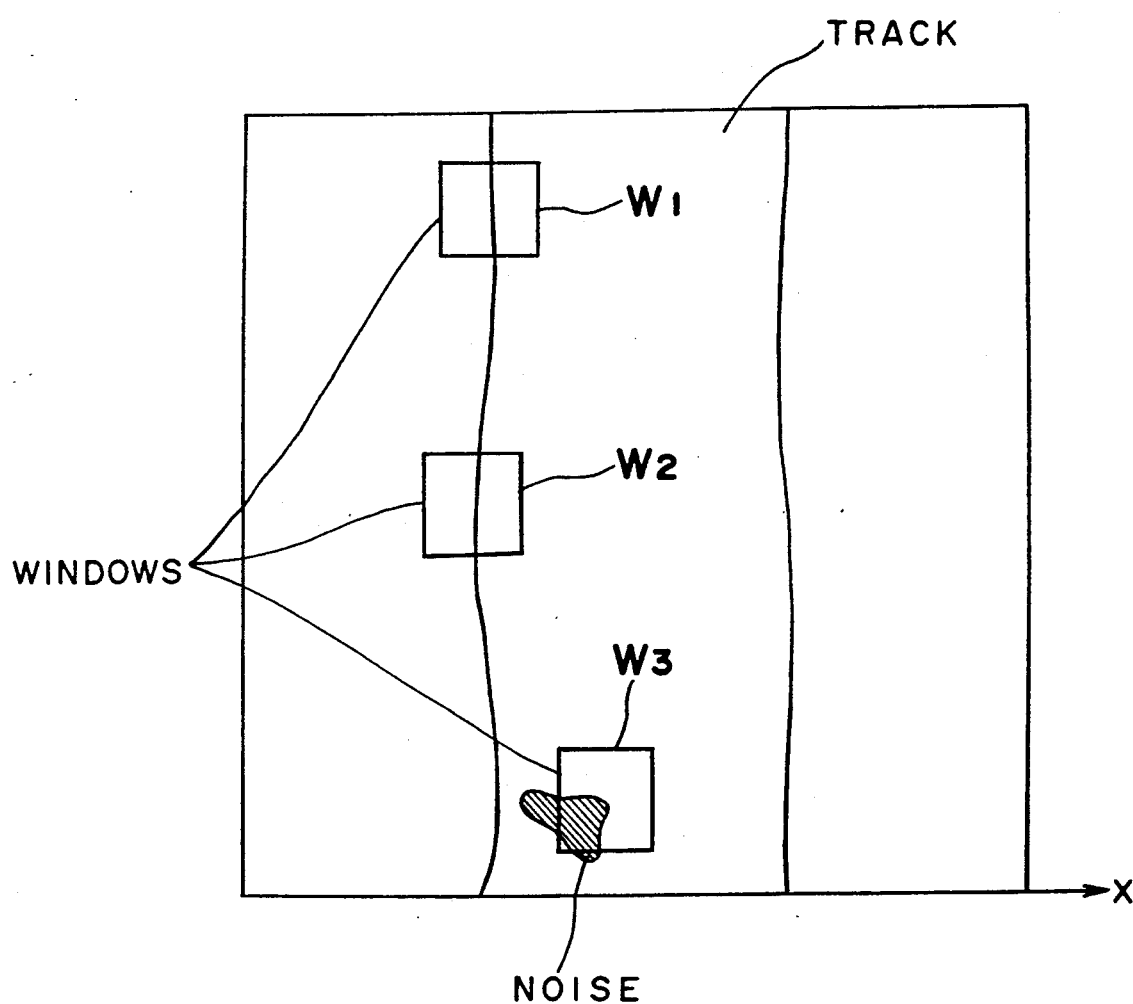
FIG. 3a is a diagrammatic view showing the setting positions of the window frames with respect to the image.

As shown in FIG. 3a, one or more window frames, e.g., three window frames W1, W2 and W3 are set (step S4). Each window frame selection is effected by arbitrarily detecting one characteristic point (one edge point), and the detected characteristic point is set as a center of the window. The window frame W3 is not located along a side of the track, because a noise producer, such as a foreign matter, is detected and is used as a center of the window frame. The image inside the window frame is then filtered with Laplacian filter or Goien filter or other type of filter and emphasized with quadratic differentiation, and the characteristic points of the characteristic member (e.g., the track side) of the object 2 are obtained using a zero crossing method or other method as points of intersection between the characteristic member and the multiple scanning lines set perpendicular to the member at each scanning line (step S5).

Next, an average point, taken in an X-axis direction, of the three centers of the window frames is obtained, and a window frame which is most deviated from the obtained average point is removed (step S6) and is not further considered in the edge detection process. Thus, according to the example shown in FIG. 3a, the window frame W3 is removed, and the processing is continued using the characteristic points plotted in the remaining two valid window frames W1 and W2.

Figure 3B:
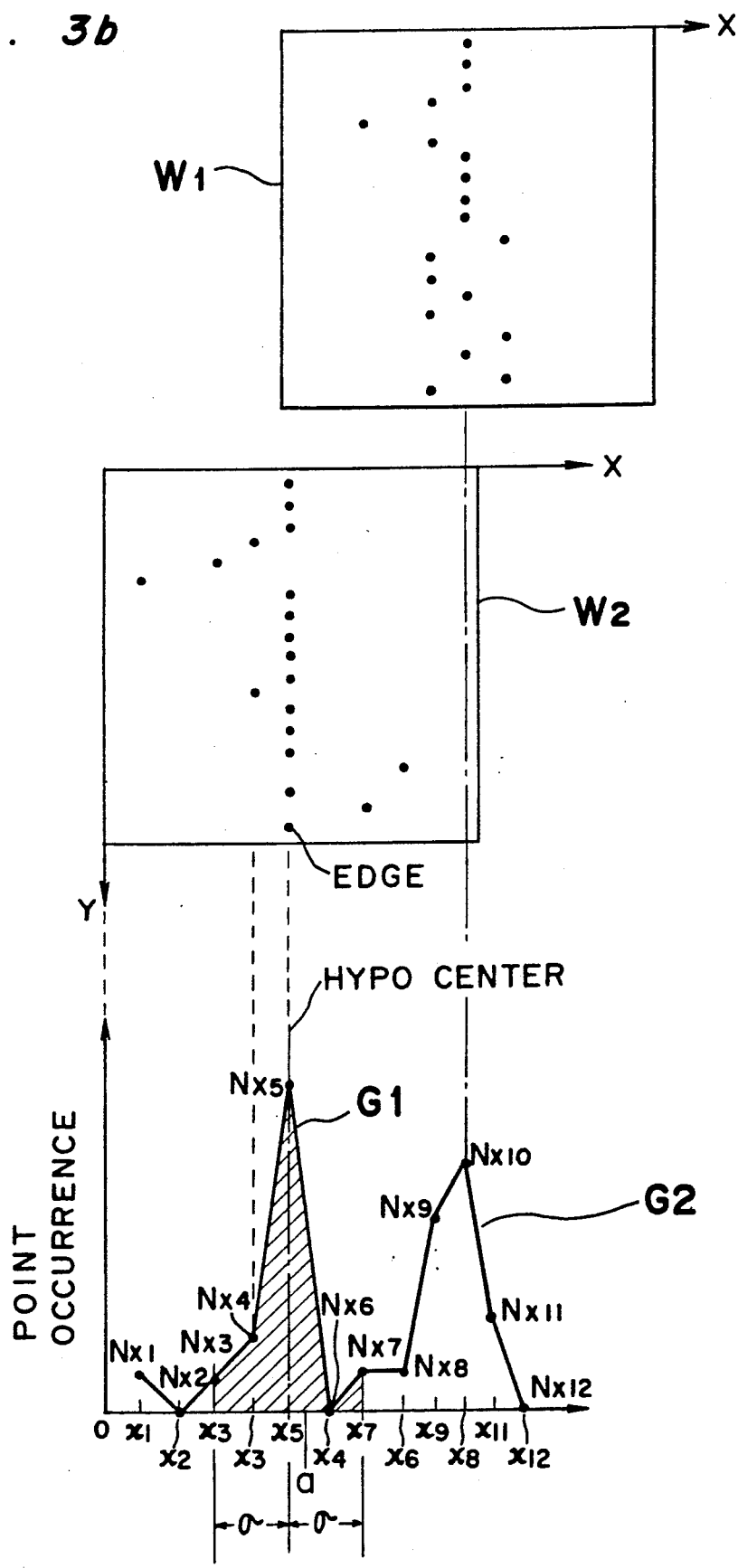
FIG. 3b is a diagram showing the sampled characteristic points of the object, together with a graph showing an occurrence distribution of the positions of the characteristic points.
Figure 4:
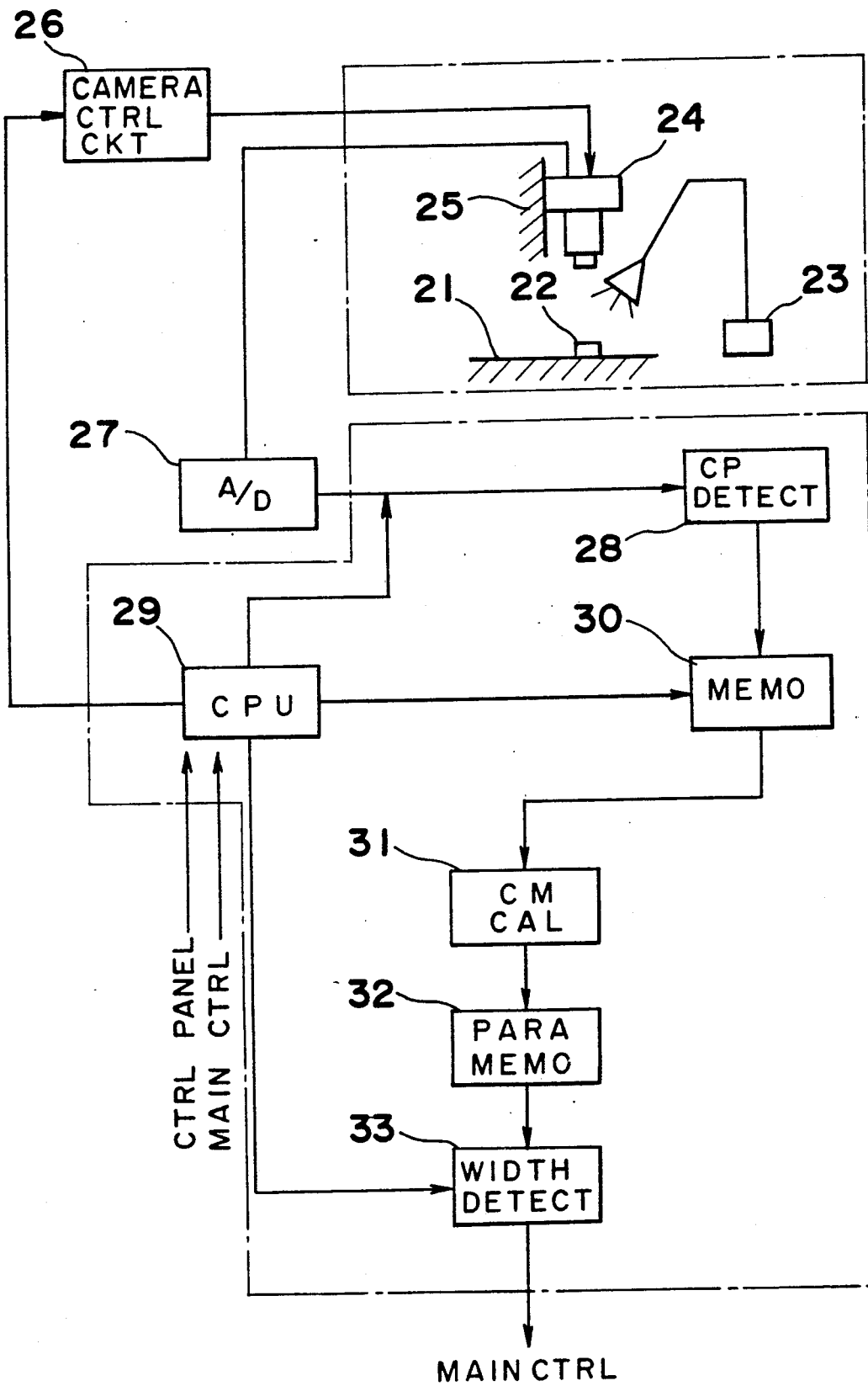
FIG. 4 is a block diagram of a width measuring device according to a prior art.

As shown in FIG. 3b, the characteristic points in each selected window, frame are graphically plotted on an X-Y plane in which the X-axis is common to both window frames W1 and W2 and is substantially parallel to the image scanning line of the TV camera 4, and the Y-axis is substantially parallel to the track extending direction. The number of characteristic points in the valid window frames W1 and W2 at points X1, X2, X3, ... Xm along the X-axis is counted to provide sets:

$$N_L = \{N_{LXi} | i = 1, 2, 3 \ldots m\}$$

in which $N_L$ represents a set for one window along the left side of the track, and $N_{LXi}$ represents the number of characteristic points in an arbitrary point $X_i$. The counted result is used to obtain an occurrence distribution, as graphically shown in FIG. 3b (step S7).

Then, from the occurrence distribution, groups are detected such that each group extends from a zero-occurrence point to next zero-occurrence point. For example, in FIG. 3b, a first group G1 covers the distribution in a region X2–X6, and the second group G2 covers the distribution in a region X6–X12 (step S8). The grouping is generally expressed as follows.

For set elements $N_{LXi}$ and $N_{RXj}$, the respective values i and j are sequentially incremented from 1 to m and n, respectively, and one group is identified as $N_{XLis}$–$N_{LXie}$ and another group as $N_{RXjs}$–$N_{RXje}$, in which $i_{sl}$ and $j_{sl}$ are values of i and j at the point when $N_{LXi}$ and $N_{RXj}$ change from a zero value to a non-zero value, respectively, and in which $i_{el}$ and $j_{el}$ are values of i and j at the point when $N_{LXi}$ and $N_{RXj}$ next become zero.

When a plurality of groups in $N_{LX}$ from windows W1 and W2 taken together are detected in the grouping means, group selection based on the measurement conditions is used to select a group (step S9). The group selection is carried out, for example, in a manner shown in FIG. 2b. At step S9a, an area of each group is calculated. At step S9b, the total area of the groups is calculated, and in turn, the area percentage of each group is calculated. If the area percentage of one group is less than a predetermined percentage, such as 40%, that group is removed and is not further considered in the width detection process. Thus, the groups with the area percentage greater than 40% are considered in the further steps. At step S9c, it is detected whether or not the width detection request is for detecting a possible narrow width. If yes, step S9d is performed to select a group located towards the inside of the track, and if no, the program goes to step S9e. At step S9e, it is detected whether or not the width detection request is for detecting a possible wide width. If yes, step S9f is performed to select a group located towards the outside of the track, and if no, the program goes to step S9g. At step S9g, a group with the greatest area is selected. In this case, the width which is considered to be the most true width will be calculated.

For example, when a possible wide width is requested, the group selection means selects, when selecting a group for the left side, that group with the lowest value i, and when selecting a group for the right side, that group with the highest, value j.

Instead of the above described method for selecting a group, other selection methods can be employed.

Then, at step S10, a weighted average of the selected group along the X-axis is obtained, and the weighted average point is set as a hypothetical center $\hat{X}_L$ of the selected group.

Then, at step S11, a set $X_L$ of a valid range $\pm\sigma$ from the hypothetical center $\hat{X}_L$, shown by a shaded area in FIG. 3b, is obtained as follows:

$$X_L = \{X_{Li} | \hat{X}_L - \sigma \geq \hat{X}_i \geq \hat{X}_L + \sigma\}$$

and a weighted average of the valid range is obtained, and the weighted average point of the valid range is set as a left edge position a, representing the position of the left side characteristic member along the X-axis.

Then, at step S12 it is determined whether or not the right side edge of the track (right side characteristic member) has been detected. If not, a similar operation through steps S4–S11 is carried out for obtaining a right edge position b, representing the position of the right side characteristic member along the X-axis.

During this procedure, the number of the characteristic points in the valid window frames in the right side of the track at points X1, X2, X3, ... Xn along the X-axis is counted to provide sets:

$N_R = \{N_{RXi} | i = 1,2,3 \ldots n\}$ in which $N_R$ represents a set for one window along the right side of the track, and $N_{RXi}$ represents the number of the characteristic points in an artibrary point $X_i$. Then, a group is selected in the above described manner.

Furthermore, a weighted average of the selected group along the X-axis is obtained, and the weighted average point is set as a hypothetical center $X_R$ of the selected group.

Then, a set $X_R$ of a valid range $\pm\sigma$ from the hypothetical center $\hat{X}_R$ is obtained as follows:

$$X_R = \{X_{Ri} | \hat{X}_R - \sigma \geq \hat{X}_i \geq X_R + \sigma\}$$

and a weighted average of the valid range is obtained, and the weighted average point of the valid range is set as a right edge position b, representing the position of the right side characteristic member along the X-axis.

Then, at step S13, a width h=b−a is calculated to obtain the distance between the characteristic members, i.e., the width of the track.

In the above embodiment, it is possible to use only one window frame. Furthermore, a window frame can be arranged to have a square configuration or a rectangular configuration elongated in the X-axis direction or in the Y-axis direction. Moreover, the size of the window frame can be selected at any desired size.

In the above embodiment, it is possible to obtain, instead of the weighted average, an X-axis value corresponding to a peak point as the hypothetical center and/or the edge position.

As will be clear from the above description of the present invention, window frames not containing data instability factors caused by contrast or shadows from the lighting used during image input or noise resulting from dust or other foreign matter can be defined using a valid frame selection means, and false characteristic points obtained at a position remote from the true characteristic points of the characteristic members of the object being measured can be removed by means of the characteristic point occurrence distribution generator, grouping means, group selection means, hypothetical center calculation means, and characteristic member calculation means, thereby making it possible to calculate a line expressing the edge of the characteristic member from valid characteristic point group of high reliability. High precision width measurements are thus possible, and high speed width measurements can be completed using the window frame setting means, thus providing particular effectiveness in practical applications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A width measuring device for measuring a width between first and second parallel characteristic members comprising:
   a video scanner for cross scanning said first and second parallel characteristic members;
   a characteristic point detection means for detecting crossing points between the characteristic members and a plurality of scanning lines intersecting perpendicularly the characteristic members;
   a characteristic point occurrence distribution generator for obtaining first and second distributions of said first and second characteristic members, respectively, based on an occurrence distribution of the crossing points;
   a grouping means for dividing said first distribution into first groups and said second distribution into second groups such that each group extends from one zero occurrence point to a next zero occurrence point with at least one peak point occurring between said two zero occurrence points;
   a group selection means for selecting a first dominant group from said first groups and a second dominant group from said second groups, based on predetermined measurement parameters;
   a hypothetical center calculation means for obtaining first and second average points of the selected first and second dominant groups, respectively, and for defining first and second average points as hypothetical center XL and XR of the first and second dominant groups;
   a characteristic member calculation means for calculating first and second valid regions $X_L$ and $X_R$ which expand a predetermined range from said hypothetical centers $\hat{X}L$ and $\hat{X}R$, respectively;
   obtaining means for obtaining first and second average values of the first and second valid regions $X_L$ and $X_R$; and
   a width detection means for calculating a difference between said first and second average values, said difference representing a width between said first and second characteristic members.

2. A width measuring device for measuring a width between first and second parallel characteristic members comprising:
   an image input means for obtaining a video signal image of said pair of parallel characteristic members;
   a characteristic point detection means for detecting crossing points between the characteristic members and a plurality of scanning lines intersecting perpendicularly the characteristic members;
   a characteristic point occurrence distribution generator for projecting the crossing points on an X-axis reference line parallel to the scanning lines, and for obtaining first and second distribution sets $N_L$ and $N_R$ for said first and second characteristic members, respectively, wherein sets $N_L$ and $N_R$ are sets of data expressing an occurrence distribution of the position of the crossing points on said X-axis and are defined as $N_L = \{N_{LXi} | i = 1,2,3 \ldots m\}$, and $N_R = \{N_{RXj} | j = 1,2,3 \ldots n\}$, in which $N_{LXi}$ and $N_{RXi}$ are set elements;
   a grouping means for dividing said set elements $N_{LXi}$ into first groups, said set elements $N_{RXj}$ into second groups, each group covering set elements from $N_{LXis}$ to $N_{LXie}$ and $N_{RXjs}$ to $N_{RXje}$, respectively, for $N_{LXi}$ and $N_{RXj}$ from i=is1 and j=js1 at which $N_{LXi}$ and $N_{RXj}$ change from zero to a non-zero value, to i=ie1 and j=je1 at which $N_{LXi}$ and $N_{RXj}$ are next zero;
   a group selection means for selecting a first dominant group from said first groups and a second dominant group from said second groups, based on predetermined measurement parameters;
   a hypothetical center calculation means for obtaining first and second average points along an X-axis of the selected first and second dominant groups, respectively, and for defining first and second average points as hypothetical centers $\hat{X}L$ and $\hat{X}R$ of the first and second dominant groups;
   a characteristic member calculation means for calculating first and second valid regions $X_L$ and $X_R$ defined as follows, $X_L = \{X_{Li} | \hat{XL} - \sigma \geq X_i \geq \hat{XL} + \sigma\}$ $X_R = \{X_{Rj} | \hat{XR} - \sigma \geq X_j \geq \hat{XR} + \sigma\}$, obtaining means for obtaining, along the X-axis, first and second average values a and b of the first and second valid regions $X_L$ and $X_R$; and
   a width detection means for calculating a width h=b−a between said first and second characteristic members.

3. A width measuring device as claimed in claim 2, wherein said group selection means selects, when selecting a first dominant group, the group with the lowest value i, and when selecting the second dominant group, the group with the highest value j.